G. C. SHEPHERD.

TEMPORARY BINDER.

APPLICATION FILED SEPT. 29, 1909.

Reissued Sept. 26, 1911.

13,295.

2 SHEETS—SHEET 1.

Witnesses:

C. F. Mason

E. M. Allen.

Inventor:

Gilbert C. Shepherd by Attorneys

Southgate & Southgate.

G. C. SHEPHERD.
TEMPORARY BINDER.
APPLICATION FILED SEPT. 29, 1909.
Reissued Sept. 26, 1911.
13,295.
2 SHEETS—SHEET 2.
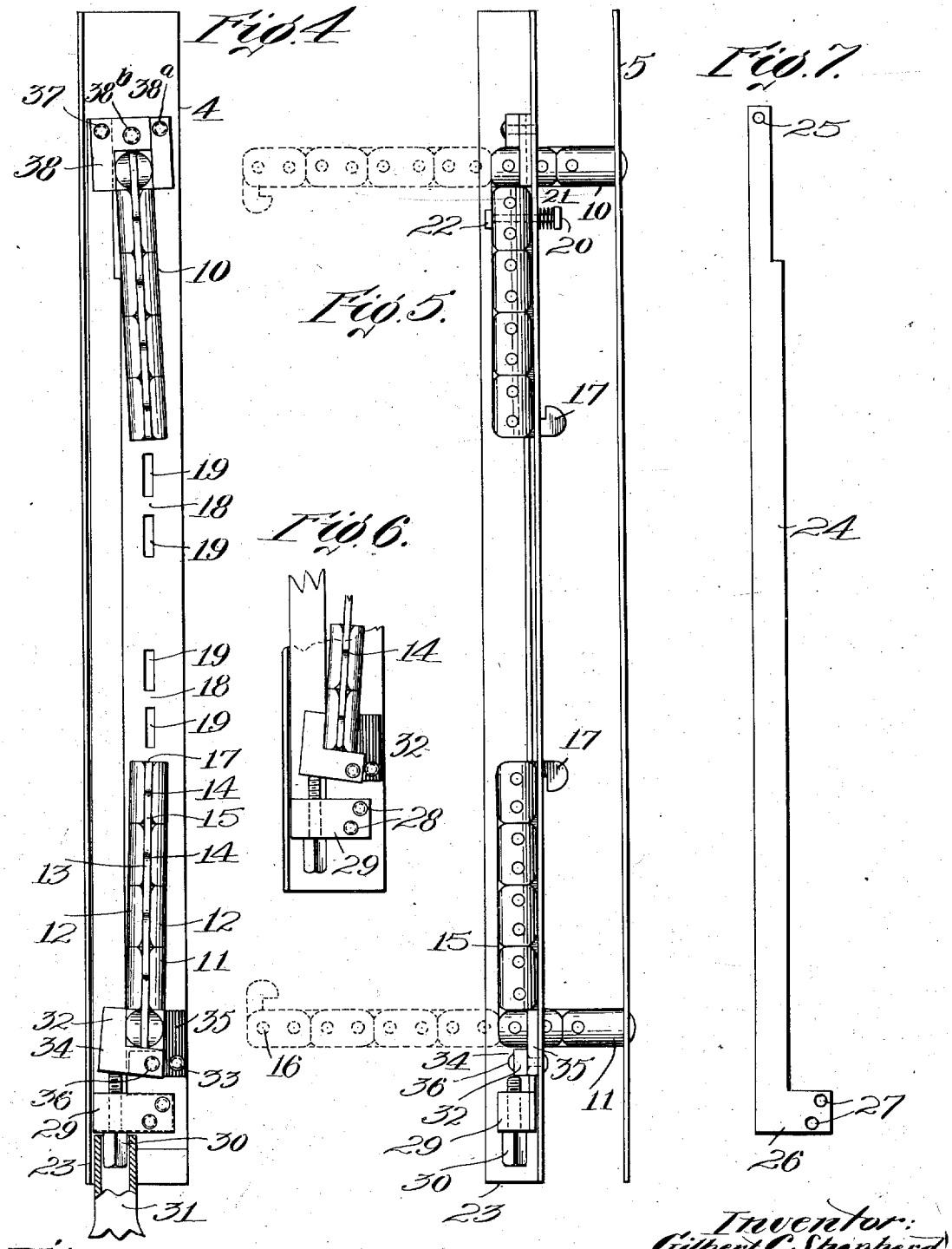
Witnesses:
C. F. Nesson
E. M. Allen.
Inventor:
Gilbert C. Shepherd
by Attorneys
Southgate & Southgate.

UNITED STATES PATENT OFFICE.

GILBERT C. SHEPHERD, OF NEW YORK, N. Y., ASSIGNOR TO OFFICE SPECIALTIES DE LUXE, INCORPORATED, OF WORCESTER, MASSACHUSETTS, A CORPORATION OF MASSACHUSETTS.

TEMPORARY BINDER.

13,295. Specification of Reissued Letters Patent. Reissued Sept. 26, 1911.

Original No. 921,469, dated May 11, 1909, Serial No. 321,795. Application for reissue filed September 29, 1909. Serial No. 520,230.

*To all whom it may concern:*

Be it known that I, GILBERT C. SHEPHERD, a citizen of the United States, and a resident of the city of New York, borough of Brooklyn, county of Kings, and State of New York, have invented a new and useful Improvement in Temporary Binders, of which the following is a specification.

The object of my invention is to provide an improved device of this class which will compactly, securely, and easily hold any number of sheets or pages within its capacity which object is accomplished by means of my invention, certain embodiments of which are hereinafter described, and more particularly pointed out in the claims.

For a more detailed description of my invention, reference is to be had to the accompanying drawings forming a part thereof, in which—

Figure 1:
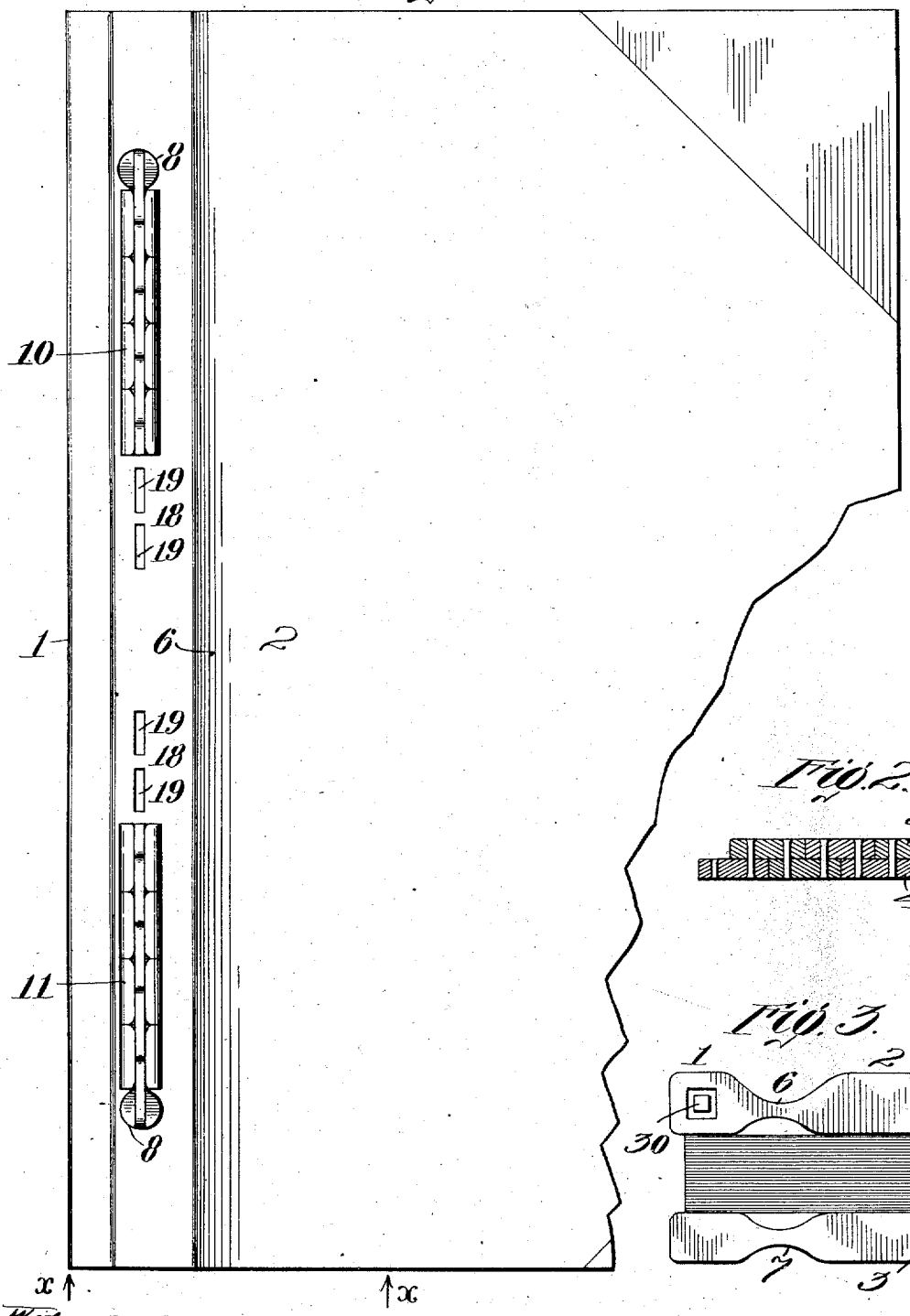
Figure 2:
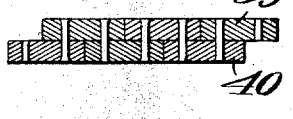
Figure 3:
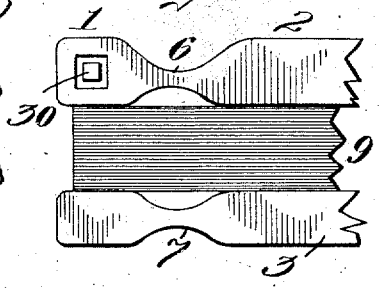

Figure 1 is a plan view of a portion of a binder provided with my improvement. Fig. 2 is a sectional view showing a modified form of flexible post structure. Fig. 3 is an end elevation looking between the points $x$—$x$ of Fig. 1 in the direction of the arrows. Fig. 4 is a plan view of my improved clamping mechanism, the cover being detached. Fig. 5 represents a side elevation of the structure shown in Fig. 4. Fig. 6 shows a portion of the structure shown in Fig. 4, the flexible post being in a slightly different position. Fig. 7 is a plan view showing the rod which connects the clamping plates.

Throughout the various views of the drawings, similar reference characters designate similar parts.

The temporary binder 1 comprises covers 2 and 3 which are fixed to strips 4 and 5 in any suitable manner. The covers 2 and 3 are reduced in thickness at 6 and 7 so as to render them flexible, and the cover is provided with a post receiving recess 8, the purpose of which will be more particularly pointed out below.

The exact form and outline of the covers 1 and 2 is not material, provided they are suited to the papers which they inclose and protect. For convenience, one type which protects the papers 9 is shown and described.

The strip 5 is preferably a plain, rectangular strip or plate with two conveniently located perforations, through which the ends of the flexible posts 10 and 11 pass. As shown in Fig. 5, these ends may be riveted to the plate 5, which manner of securing them is the best known to me, although others may be employed, as desired.

As the flexible posts 10 and 11 are identical, a description of one will answer for both. They each comprise two outer rows of links 12 which have an inner row of links 13 sandwiched in between them. The links 12 and 13 are preferably made so as to give a substantially circular exterior form to the posts, and the edges of the links 12 are so shaped as to permit the posts to be flexed in one direction only. As shown in Figs. 1, 4 and 6, the exposed edges or ends of the links 13 are given a slightly curved form, as indicated at 14, so that when the binder is being closed, and the posts pressed into the recess on the cover, there is no danger of having the operator's fingers pinched between the ends of the links 13. For the same reason the exterior corners or ends of the links 12 are curved in a similar manner, as is apparent from Figs. 1, 4, 5 and 6. The links 12 and 13 are held together by means of pins or studs 16 which are circular in cross section and cylindrical in form, just as in an ordinary sprocket chain. The links 12 abut against each other as shown in Fig. 4, as do also the links 13. The reason for this is that if these ends did not abut as above described, the paper held in the binder might slip in between the joints and give trouble, especially if the perforations should become somewhat enlarged, or for some other reason should fail to fit the binding post. The free end of each post is provided with a hook 17 in lieu of a link 13 which hook 17 projects beyond the links 12, and is adapted to engage the parts 18 of the plate 4 which separate the slots 19. The purpose of the hooks 17 is to secure the free ends of the chains 10 and 11, so that these free ends will rest snugly against the plate 4 or the cover 2, when the binder contains less than the greatest number of pages 9 which it will hold. If desired, this hook 17 may be dispensed with, and in lieu thereof pins 20 may be used which are encircled by coiled springs 21, which coiled springs tend to bring the enlarged head 22 of the pins 21 against the chain, thereby holding the otherwise unsecured free end of the post parallel with and against the back 4.

The strip 4 is preferably provided with a web 23 turned at right angles to the other part of the plate, whereby greater rigidity and strength is given to the strip 4, and all tendency to buckle or bend is eliminated.

As shown in Figs. 4 and 5, the posts 10 and 11 pass through the perforations in the strip 4 adjacent to certain clamping mechanism. This clamping mechanism comprises a bar or rod 24 which is slightly reduced at one end, and provided with a perforation 25, and at its other end is provided with a lug 26 which runs at right angles to the main part of the bar, and this lug 26 is provided with two perforations 27.

Through the perforations 27 extend rivets 28 which secure a screw-threaded lug or projection 29 to the projection 26. A set screw 30 passes through the lug 29 and may be manipulated in the usual manner by means of a key 31. One end of this set screw 30 impinges against a U-shaped clamping plate 32 which is pivoted at 36 to the plate 4. The U-shaped clamping plate 32 preferably comprises two L-shaped sections 34 and 35, which are connected by means of a pin 36, so that one section rests on and is offset from the other. As shown in Fig. 5, the parts 34 and 35 are preferably twice as thick as the rod 24, so that the part 34, when in the position shown in Fig. 4, is raised altogether free from the plate 4.

A pivot pin 37 passes through the perforation 25 in the rod 24, and pivotally connects a U-shaped clamping piece 38 to said rod. This plate 38 is also pivoted as shown at $38^a$ to the strip 4 and its parts are united by means of a pin $38^b$. Pivot pin 33 is only employed for the purpose of securing the clamp 35 to the plate.

In Fig. 2 is shown a modified post structure in which only two rows of links 39 and 40 are employed. This structure is inferior to the preferred form shown in Figs. 1, 4, 5 and 6 in which three rows of links are employed, but is cheaper than the same exterior form, and may be given the same exterior shape, and finish, so that it may be advantageously used where a cheaper structure is desired.

From the foregoing, the operation of my improved binder will be readily understood. Assuming the binder to be in the position indicated by Fig. 5, it is opened by disengaging the hooks 17 from the parts 18, thus releasing the free ends of the posts 10 and 11, until they assume the position indicated by the dotted lines in Fig. 5. The screw 30 is then turned by the key 31 until this screw 30 is withdrawn from the U-shaped piece 32. As the screw 30 is thus withdrawn, the tension on the clamping piece 32 is withdrawn as well as the tension of the clamping piece 38. The leaves 9 may then be taken from or inserted in the binder as desired, as these leaves have openings which correspond to the posts, which openings may be of any suitable form. When the requisite number of pages is in place, the strip 4 is pressed against them, and the clamp screw is turned so that its ends will impinge against the clamp 32, thereby pressing the arm 34 of the clamp against the post 11, and at the same time drawing the rod 24 whereby the clamp 38 is forced against the post 10. Thus the clamps 38 and 35 which are secured to the plate 4, reinforce that plate so that when the screw 30 is turned against the U-shaped clamp 32, it will be pressed against the post 11. The clamp 38 is then drawn against the post 10 so that the plate 4 is securely held in position against the posts. This clamping action takes place whether the links 12 are in the plane of or perpendicular to the plane of the U-shaped clamping pieces 32 and 38. The former position is indicated in Fig. 6, the latter in Fig. 4.

It is obvious that various details may be changed without departing from the spirit of invention or sacrificing any of the advantages thereof, so that I do not regard it as limited to the precise structure herein shown and described, but regard it as covering all devices which come within the scope of the annexed claims.

I claim:

1. In a temporary binder or similar device strips, posts uniting said strips, and clamps for securing one of said strips to said posts in an adjustable manner, said clamps comprising a bar provided at one end with a U-shaped plate, and at its other end with a lug through which a screw passes and engages a second U-shaped plate, which is secured to said strip whereby the clamps may be tightened on the posts by loosening or tightening the screw.

2. In a temporary binder or similar device, strips, posts, uniting said strips, and clamps for securing said posts to one of said strips, said clamps including a rod to one end of which is pivoted one part of a U-shaped plate comprising two angular parts secured together, and the other end of which is secured to a screw-threaded projection, a screw passing through said projection, a second U-shaped plate pivotally connected with said strip and so disposed and arranged that a portion of it is impinged upon by said screw, whereby both clamps may be tightened or loosened by merely tightening the screw.

3. In a temporary binder or similar device, strips, means for adjustably connecting said strips, and clamps for engaging said connecting means, said clamps comprising a bar having a U-shaped plate pivotally connected near one end and a projection at the other end of said bar, a second U-shaped plate pivotally connected with one of said strips, and means connecting said projection and second U-shaped plate, whereby the clamp may be loosened or tightened by adjusting said connecting means.

4. As an article of manufacture, a clamp for temporary binders, and the like, comprising a strip, a rod slidably mounted on said strip, a U-shaped plate with offset portions pivotally mounted on one end of said rod, a projection fixed to the other end of said rod, and a second U-shaped clamp pivotally mounted on said strip, and connected with said projection by adjustable means.

5. In a temporary binder or similar device, strips and posts uniting said strips, each of said posts comprising a plurality of links with a row of relatively narrower links sandwiched in between them, said links being curved at the limits of their outer edges.

6. In a temporary binder or similar device, covers, one of which is recessed to receive posts, posts uniting said covers, each of said posts being provided with a plurality of rows of outer links, and an inner row of links sandwiched in between said outer links, said posts being so shaped as to fit and rest in said recess in said cover, means for clamping one of said covers to said posts, and further means for holding the free ends of said posts within said recess.

7. In a temporary binder or similar device, a flexible post composed of links, U-shaped clamping pieces and means for forcing said clamping pieces against said links, whether said links be in the plane of or perpendicular to said clamping pieces.

8. In a temporary binder or similar device, strips, posts uniting said strips, each of said posts comprising a plurality of links with a row of relatively narrower links sandwiched in between them, said links being curved at the limits of their outer edges and forming a post of substantially circular cross section.

9. A binding post composed of a plurality of rows of abutting links which are so shaped as to give said post a cylindrical exterior.

10. A binding post composed of links arranged in a plurality of rows, the said links being so combined as to give the post a circular cross-section and the links on each row having abutting ends.

11. A loose-leaf binder comprising a support, a substantially rigid impaling post erected thereon and consisting of rigid sections joined together, to admit of the bending over in only a single direction of different lengths of the upper portion thereof, to about a right angle with the base portion of the post; a cover, and means to lock down upon the cover the bent-over section or sections of the post.

12. A filing device comprising a substantially rigid impaling post consisting of numerous rigid sections hinged end to end to permit one or more of the upper sections to lie crosswise of the lower section; the top section forming an impaling tip.

13. A filing device comprising a base and an impaling post erected thereon, said post consisting of numerous sections hinged together end to end, and forming a single substantially unbroken body, each lower section having at the joint means to support the next section above, to form a substantially rigid post; the top section forming an impaling tip.

14. A substantially rigid impaling post and a base whereon it is erected, said post consisting of numerous sections forming together a substantially unbroken body and united end to end by means of hinges in such a manner that any member of the upper sections may lie transverse to the bottom section, the pintles of the hinges being parallel, and coöperative shoulders being formed upon the adjoining ends of all the sections to prevent the hinges from opening further when the sections reach upright positions; the bottom section fixed rigidly upon said base, and the top section forming an impaling tip.

15. A loose-leaf binder comprising a base and a pair of substantially rigid impaling posts thereon, each post consisting of an impaling tip and bottom sections all hinged together end to end, and the sections being shouldered to prevent their movement beyond an upright position.

16. A loose-leaf binder comprising a base and a pair of substantially rigid impaling posts thereon, each post consisting of sections hinged together end to end, and the sections being shouldered to prevent movement beyond an upright position; the shoulders being upon the outer side of each post so that the posts can bend only toward each other.

17. A loose-leaf binder comprising a base, a pair of impaling posts thereon, a detachable cover through which the posts rise, the posts being substantially rigid when extended but capable of sufficient flection to lie down upon said cover, and means for locking the posts down upon the cover, so that the posts secure the cover in place.

18. A loose-leaf binder comprising top and bottom covers and intermediate substantially rigid impaling posts made in permanently connected sections such that the portions of the posts between the covers may be lengthened or shortened, and releasable means for locking the posts in their lengthened or shortened condition.

19. A substantially rigid impaling post consisting of numerous cylindrical sections jointed together end to end to form a smooth stem collapsible only in a single direction.

20. A loose-leaf binder comprising a base, substantially rigid impaling posts thereon, and a cover having in its top surface a depression, and having perforations in said depression through which said posts rise, the latter consisting of jointed sections foldable down within said depression.

21. A loose-leaf binder comprising a base, a cover, and a pair of substantially rigid impaling posts, each comprising a bottom section fixed to the base, an impaling tip, and intervening sections, all the sections hinged together end to end, said cover having openings therethrough, whereby it may be impaled upon said posts, and the latter being foldable at any of their joints down upon the cover, and the cover having in its top surface a recess to receive the folded over portions of the posts, said recesses sufficiently deep to permit the sections to lie wholly below the top of the cover.

In testimony whereof I have hereunto set my hand in the presence of two subscribing witnesses.

GILBERT C. SHEPHERD.

Witnesses:
E. M. Dean,
J. H. Sykes.